US011729212B2

(12) United States Patent
Rodriguez et al.

(10) Patent No.: US 11,729,212 B2
(45) Date of Patent: *Aug. 15, 2023

(54) SYSTEMS AND METHODS FOR USE OF ADDRESS FIELDS IN A SIMULATED PHISHING ATTACK

(71) Applicant: KnowBe4, Inc., Clearwater, FL (US)

(72) Inventors: Jasmine Rodriguez, Clearwater, FL (US); Daniel Cormier, Clearwater, FL (US)

(73) Assignee: KnowBe4, Inc., Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,551

(22) Filed: Aug. 30, 2021

(65) Prior Publication Data

US 2021/0392164 A1 Dec. 16, 2021

Related U.S. Application Data

(63) Continuation of application No. 16/860,689, filed on Apr. 28, 2020, now Pat. No. 11,108,821.
(Continued)

(51) Int. Cl.
*G06F 21/00* (2013.01)
*H04L 9/40* (2022.01)
(Continued)

(52) U.S. Cl.
CPC ...... *H04L 63/1483* (2013.01); *G09B 19/0053* (2013.01); *H04L 51/08* (2013.01)

(58) Field of Classification Search
CPC .. H04L 63/1483; H04L 51/08; G09B 19/0053
See application file for complete search history.

(56) References Cited

U.S. PATENT DOCUMENTS 7,188,358 B1 3/2007 Hisada et al.
7,599,992 B2 10/2009 Nakajima
(Continued)

FOREIGN PATENT DOCUMENTS

EP 3 582 468 A1 12/2019
WO WO-2016/164844 A1 10/2016

OTHER PUBLICATIONS

Abu-Nimeh et al., "A Comparison of Machine Learning Techniques for Phishing Detection," eCrime '07: Proceedings of the anti-phishing working groups 2nd annual eCrime researchers summit, 2007, pp. 60-69, ACM Digital Library.
(Continued)

*Primary Examiner* — Shewaye Gelagay
*Assistant Examiner* — Michael M Lee
(74) *Attorney, Agent, or Firm* — Foley & Lardner LLP

(57) ABSTRACT

Systems and methods are disclosed for creating simulated phishing attack messages that have characteristics which make them appear genuine, while also having characteristics that a user should recognize as being false. Simulated phishing emails may appear to be more realistic to a recipient user if the user observes that the email has also been sent to an individual known to the recipient within the same company. However, it may not be desirable to send the simulated phishing email to such additional recipients. The systems and methods include communicating a simulated phishing email from a server of a simulated phishing attack system to a recipient user of an entity. The simulated phishing email appears to the recipient user as though it is also addressed to one or more non-recipient users of the entity, even though the email is not sent to the non-recipient users.

18 Claims, 7 Drawing Sheets

Related U.S. Application Data

(60) Provisional application No. 62/841,532, filed on May 1, 2019.

(51) Int. Cl.
    *G09B 19/00*     (2006.01)
    *H04L 51/08*     (2022.01)

(56) References Cited

U.S. PATENT DOCUMENTS

| | | |
|---|---|---|
| 8,041,769 B2 | 10/2011 | Shraim et al. |
| 8,464,346 B2 | 6/2013 | Barai et al. |
| 8,484,741 B1 | 7/2013 | Chapman |
| 8,615,807 B1 | 12/2013 | Higbee et al. |
| 8,635,703 B1 | 1/2014 | Belani et al. |
| 8,677,495 B1 | 3/2014 | Yang et al. |
| 8,719,940 B1 | 5/2014 | Higbee et al. |
| 8,793,799 B2 | 7/2014 | Fritzson et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,237,121 B1 * | 1/2016 | Graham ............... H04L 51/212 |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,373,267 B2 | 6/2016 | Sadeh-Koniecpol et al. |
| 9,398,029 B2 | 7/2016 | Sadeh-Koniecpol et al. |
| 9,398,038 B2 | 7/2016 | Higbee et al. |
| 9,591,017 B1 | 3/2017 | Higbee et al. |
| 9,635,052 B2 | 4/2017 | Hadnagy |
| 9,667,645 B1 | 5/2017 | Belani et al. |
| 9,674,221 B1 | 6/2017 | Higbee et al. |
| 9,729,573 B2 | 8/2017 | Gatti |
| 9,813,454 B2 | 11/2017 | Sadeh-Koniecpol et al. |
| 9,870,715 B2 | 1/2018 | Sadeh-Koniecpol et al. |
| 9,876,753 B1 | 1/2018 | Hawthorn |
| 9,894,092 B2 | 2/2018 | Irimie et al. |
| 9,912,687 B1 | 3/2018 | Wescoe et al. |
| 9,942,249 B2 | 4/2018 | Gatti |
| 9,998,480 B1 | 6/2018 | Gates et al. |
| 10,243,904 B1 | 3/2019 | Wescoe et al. |
| 10,904,186 B1 | 1/2021 | Everton et al. |
| 10,986,122 B2 | 4/2021 | Bloxham et al. |
| 11,044,267 B2 | 6/2021 | Jakobsson et al. |
| 11,184,393 B1 | 11/2021 | Gendre et al. |
| 11,297,094 B2 | 4/2022 | Huda |
| 2005/0117715 A1 * | 6/2005 | Bordia ............... H04L 51/12 |
| | | 379/88.13 |
| 2007/0142030 A1 | 6/2007 | Sinha et al. |
| 2007/0283000 A1 * | 12/2007 | Proux ............... H04L 63/1441 |
| | | 709/224 |
| 2007/0299777 A1 * | 12/2007 | Shraim ............... H04L 63/1441 |
| | | 705/51 |
| 2009/0182818 A1 * | 7/2009 | Krywaniuk ............... H04L 51/212 |
| | | 709/206 |
| 2010/0211641 A1 | 8/2010 | Yih et al. |
| 2010/0269175 A1 | 10/2010 | Stolfo et al. |
| 2012/0124671 A1 | 5/2012 | Fritzson et al. |
| 2012/0258437 A1 | 10/2012 | Sadeh-Koniecpol et al. |
| 2013/0067012 A1 | 3/2013 | Matzkel et al. |
| 2013/0198846 A1 | 8/2013 | Chapman |
| 2013/0203023 A1 | 8/2013 | Sadeh-Koniecpol et al. |
| 2013/0219495 A1 | 8/2013 | Kulaga et al. |
| 2013/0297375 A1 | 11/2013 | Chapman |
| 2014/0173726 A1 | 6/2014 | Varenhorst |
| 2014/0199663 A1 | 7/2014 | Sadeh-Koniecpol et al. |
| 2014/0199664 A1 | 7/2014 | Sadeh-Koniecpol et al. |
| 2014/0201835 A1 | 7/2014 | Emigh et al. |
| 2014/0230061 A1 | 8/2014 | Higbee et al. |
| 2014/0230065 A1 | 8/2014 | Belani et al. |
| 2015/0163242 A1 | 6/2015 | Laidlaw et al. |
| 2015/0180896 A1 | 6/2015 | Higbee et al. |
| 2015/0229664 A1 | 8/2015 | Hawthorn et al. |
| 2016/0036829 A1 | 2/2016 | Sadeh-Koniecpol et al. |
| 2016/0142439 A1 | 5/2016 | Goutal |
| 2016/0164898 A1 | 6/2016 | Belani et al. |
| 2016/0173510 A1 | 6/2016 | Harris et al. |
| 2016/0234245 A1 | 8/2016 | Chapman |
| 2016/0261618 A1 | 9/2016 | Koshelev |
| 2016/0301705 A1 | 10/2016 | Higbee et al. |
| 2016/0301716 A1 | 10/2016 | Sadeh-Koniecpol et al. |
| 2016/0308897 A1 | 10/2016 | Chapman |
| 2016/0330238 A1 | 11/2016 | Hadnagy |
| 2017/0026410 A1 | 1/2017 | Gatti |
| 2017/0078322 A1 | 3/2017 | Seiver et al. |
| 2017/0104778 A1 | 4/2017 | Shabtai et al. |
| 2017/0140663 A1 | 5/2017 | Sadeh-Koniecpol et al. |
| 2017/0237776 A1 | 8/2017 | Higbee et al. |
| 2017/0244746 A1 | 8/2017 | Hawthorn et al. |
| 2017/0251009 A1 | 8/2017 | Irimie et al. |
| 2017/0251010 A1 | 8/2017 | Irimie et al. |
| 2017/0318046 A1 | 11/2017 | Weidman |
| 2017/0331848 A1 | 11/2017 | Alsaleh et al. |
| 2018/0041537 A1 | 2/2018 | Bloxham et al. |
| 2018/0077098 A1 | 3/2018 | Arshad et al. |
| 2018/0103052 A1 | 4/2018 | Choudhury et al. |
| 2018/0295153 A1 * | 10/2018 | Eisen ............... H04L 63/1433 |
| 2019/0075121 A1 * | 3/2019 | Dutta ............... H04L 63/102 |
| 2019/0173819 A1 | 6/2019 | Wescoe et al. |
| 2019/0215335 A1 | 7/2019 | Benishti |
| 2019/0245885 A1 | 8/2019 | Starink et al. |
| 2019/0306192 A1 * | 10/2019 | Xie ............... H04L 51/28 |
| 2020/0213332 A1 | 7/2020 | Thirumavalavan |
| 2020/0311260 A1 | 10/2020 | Klonowski et al. |
| 2021/0075827 A1 | 3/2021 | Grealish |
| 2021/0185075 A1 | 6/2021 | Adams |
| 2021/0194924 A1 | 6/2021 | Heinemeyer et al. |
| 2021/0407308 A1 | 12/2021 | Brubaker et al. |
| 2022/0005373 A1 | 1/2022 | Nelson et al. |
| 2022/0006830 A1 | 1/2022 | Wescoe |
| 2022/0078207 A1 | 3/2022 | Chang et al. |
| 2022/0094702 A1 | 3/2022 | Saad Ahmed et al. |
| 2022/0100332 A1 | 3/2022 | Haworth et al. |
| 2022/0116419 A1 | 4/2022 | Kelm et al. |
| 2022/0130274 A1 | 4/2022 | Krishna Raju et al. |
| 2022/0286419 A1 | 9/2022 | Stetzer et al. |

OTHER PUBLICATIONS

Non-Final Office Action on U.S. Appl. No. 16/860,689 dated Sep. 22, 2020.

Palka et al., "Dynamic phishing content using generative grammars," Software Testing, Verification and Validation Workshops (ICSTW), 2015 IEEE Eighth International Conference, Date of Conference: Apr. 13-17, 2015,IEEE Xplore, pp. 1-8.

U.S. Notice of Allowance on U.S. Appl. No. 16/860,689 dated Jun. 25, 2021.

U.S. Office Action on U.S. Appl. No. 16/860,689 dated Dec. 22, 2020.

* cited by examiner

← 220 mx.website.com ESMTP 133si4170893edb.147 - gsmtp

→ HELO psm.simulatedphisher.com

← 250 mx.website.com at your service

→ MAIL FROM:<dc618da377a6415aafeeeab737592bd5@psm.simulatedphisher.com>

← 250 2.1.0 OK 133si4170893edb.147 - gsmtp

→ RCPT TO:user@customer.com [THIS IS THE ACTUAL RECIPIENT OF THE EMAIL]

← 250 2.1.5 OK 133si4170893edb.147 - gsmtp

→ DATA

← 354  Go ahead 133si4170893edb.147 - gsmtp

→ From: Your Bank <fd25d7cb8b39456c98f96c9d913e68d2@training.simulatedphisher.com>

→ Date: Mon, 11 Feb 2019 20:35:14 GMT

→ To: <user@customer.com>, <user's-boss@customer.com>

→ CC: <user's-boss'-boss@customer.com>

→ Subject: Wire Transfer

→ Content-Type: text/html

→

→ <html><body>

→ Please <a href="https://training.simulatedphisher.com/fd25d7cb8b39456c98f96c9d913e68d2">click here</a> confirm incoming wire transfer.

→ </body></html>

→ .

← 250 2.0.0 OK  1549918046 133si4170893edb.147 - gsmtp

*Fig.4*

SYSTEMS AND METHODS FOR USE OF ADDRESS FIELDS IN A SIMULATED PHISHING ATTACK

RELATED APPLICATIONS

This patent application claims the benefit of and priority to U.S. patent application Ser. No. 16/860,689 titled "SYSTEMS AND METHODS FOR USE OF ADDRESS FIELDS IN A SIMULATED PHISHING ATTACK," and filed Apr. 28, 20, which claims the benefit of and priority to U.S. Provisional Patent Application No. 62/841,532 titled "SYSTEMS AND METHODS FOR USE OF ADDRESS FIELDS IN A SIMULATED PHISHING ATTACK," and filed May 1, 2019, the contents of all of which are hereby incorporated herein by reference in its entirety for all purposes This disclosure generally relates to creating simulated phishing attack messages that have characteristics which make them look extremely realistic, while also having characteristics that a user should recognize as being false.

BACKGROUND OF THE DISCLOSURE

Cybersecurity incidents cost companies millions of dollars each year in actual costs and can cause customers to lose trust in an organization. The incidents of cybersecurity attacks and the costs of mitigating the damage is increasing every year.

Phishing attacks are cyber security threats that exploit human behavior to gain access to organizational systems and personal information of users. The attacks utilize a message sent to a user, where the message has content that convinces the receiver of the attack that the message is genuine and that they should act upon it. The more genuine the message appears to be, the higher the likelihood the user will respond to it. To this end, the threats incorporate content that the user will recognize as genuine, personal, or believable.

Simulated phishing attacks are used to teach users to recognize real phishing attacks, so that they will not fall prey to actual attacks and jeopardize the security of an associated entity. These simulated attacks include tricks that real phishing emails use, to try and teach the user to recognize these. As with real threats, the more genuine looking a simulated attack is, the more likely a user will respond to it, which provides an opportunity for the simulated phishing attack system to train the user to recognize very sophisticated attack vectors.

BRIEF SUMMARY OF THE DISCLOSURE

Systems and methods are described for communicating a simulated phishing email from a server to a recipient user of an entity. The method comprises a server generating email addresses of non-recipient users of the entity, which are displayed as recipients of the simulated phishing email that is sent to the recipient user. The method includes generating the simulated phishing email and initiating its transmission to a mail server of the entity. In examples of the method, the server identifies via Simple Mail Transfer Protocol (SMTP) only the recipient user as a recipient of the simulated phishing email, instead of identifying the recipient user and non-recipient users as recipients of the simulated phishing email. In further examples, the method includes communicating the content of the simulated phishing email to the recipient user to cause the simulated phishing email to be displayed with the one or more email addresses of the non-recipient users displayed as recipients of the simulated phishing email.

Other aspects and advantages of the invention will become apparent from the following detailed description, taken in conjunction with the accompanying drawings, which illustrate by way of example the principles of the invention.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 4 depicts an example of an SMTP (Simple Mail Transfer Protocol) session in accordance with some embodiments.

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods that are useful for creating simulated phishing attack messages that have characteristics which make them look extremely realistic, while also having characteristics that a user should recognize as being false.

A. Computing and Network Environment

Figure 1A:
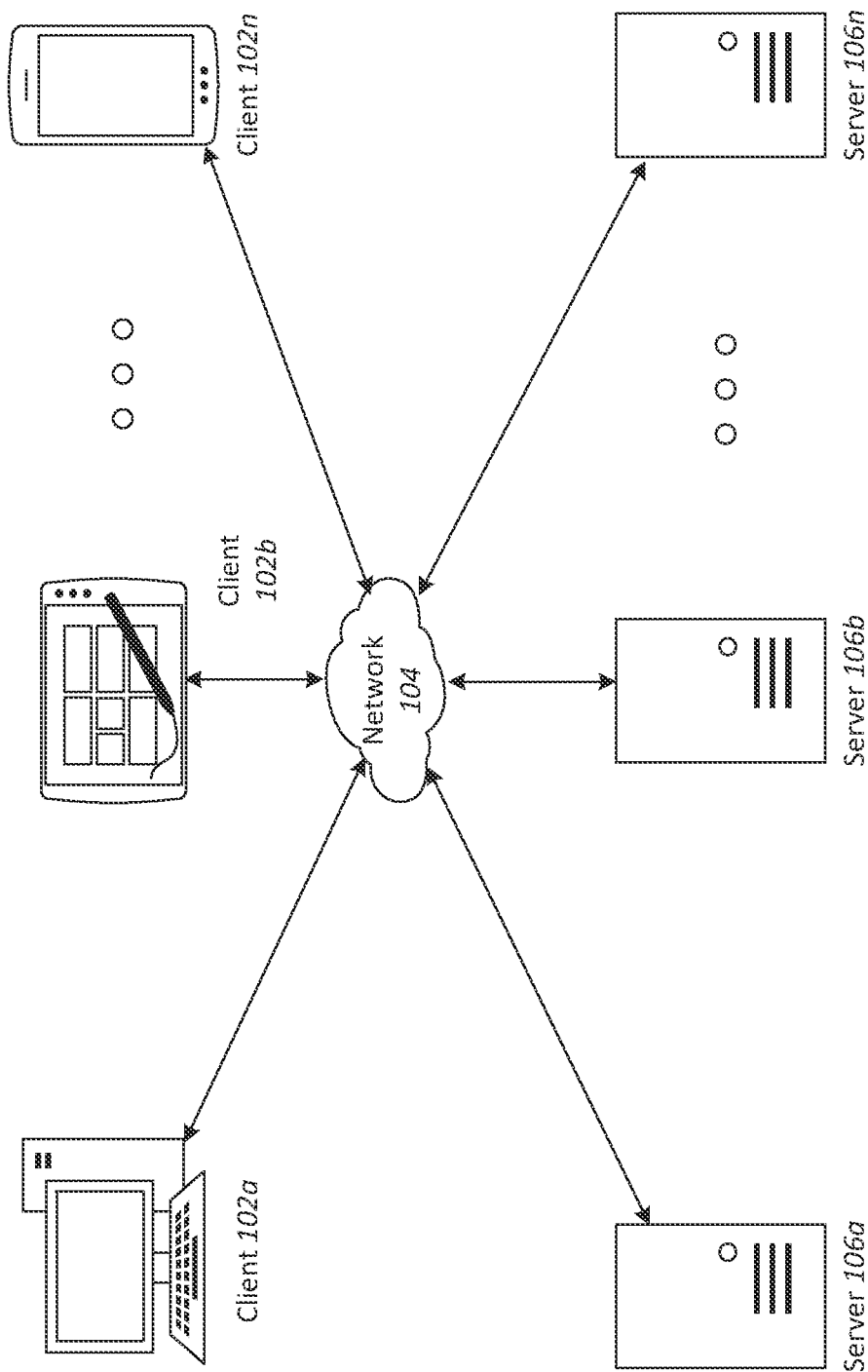
FIG. 1A is a block diagram depicting an embodiment of a network environment comprising client device in communication with server device.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as $_1$G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare-Workstation and VirtualBox, manufactured by Oracle Corporation of Redwood City, Calif.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
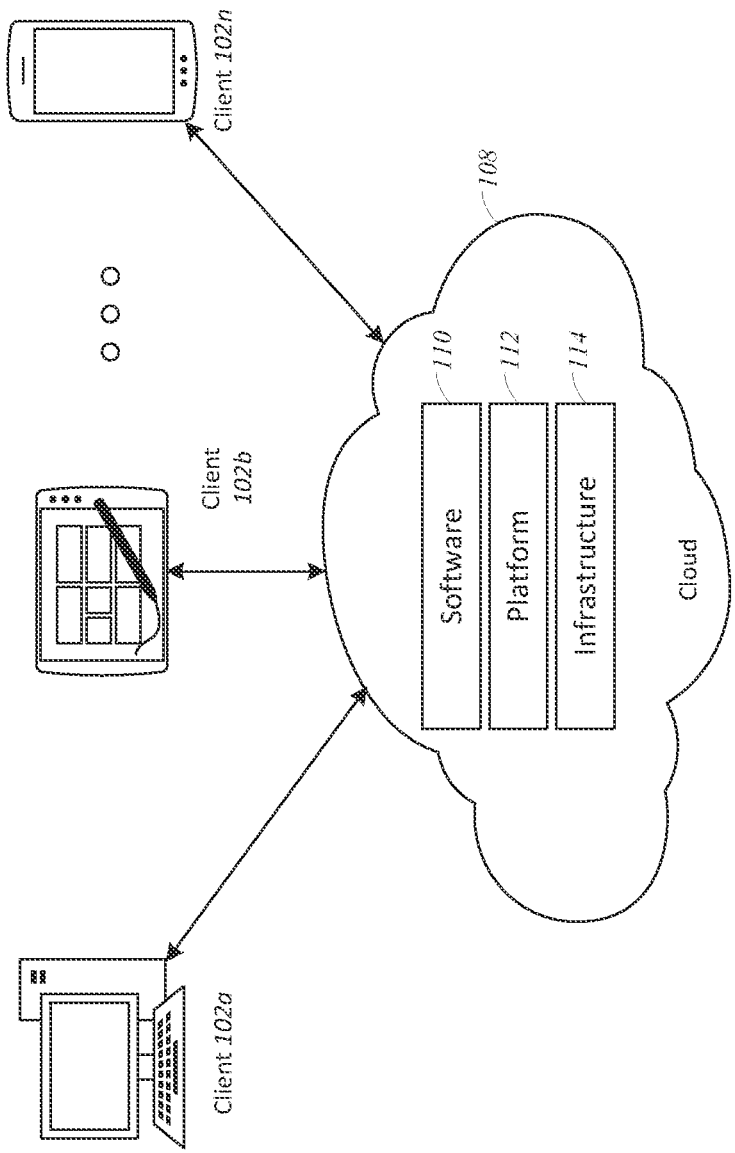
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 109 may include both the private and public networks 104 and servers 106.

The cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers or virtualization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g. Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. Google Chrome, Microsoft Internet Explorer, or Mozilla Firefox provided by Mozilla Foundation of Mountain View, Calif.). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The client 102 and server 106 may be deployed as and/or executed on any type and form of computing device, e.g., a computer, network device or appliance capable of communicating on any type and form of network and performing the operations described herein.

Figure 1C:
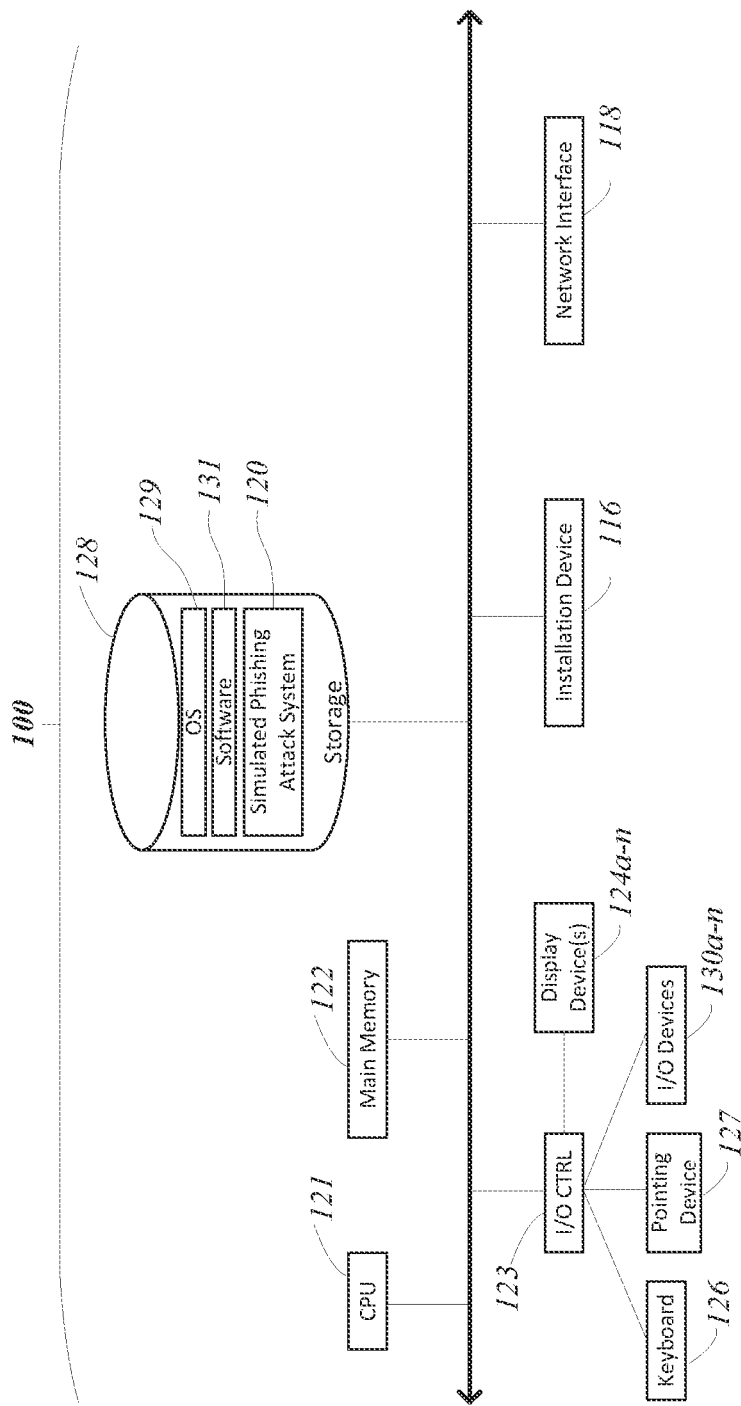
FIGS. 1C and 1D are block diagrams depicting embodiments of computing devices useful in connection with the methods and systems described herein.
Figure 1D:
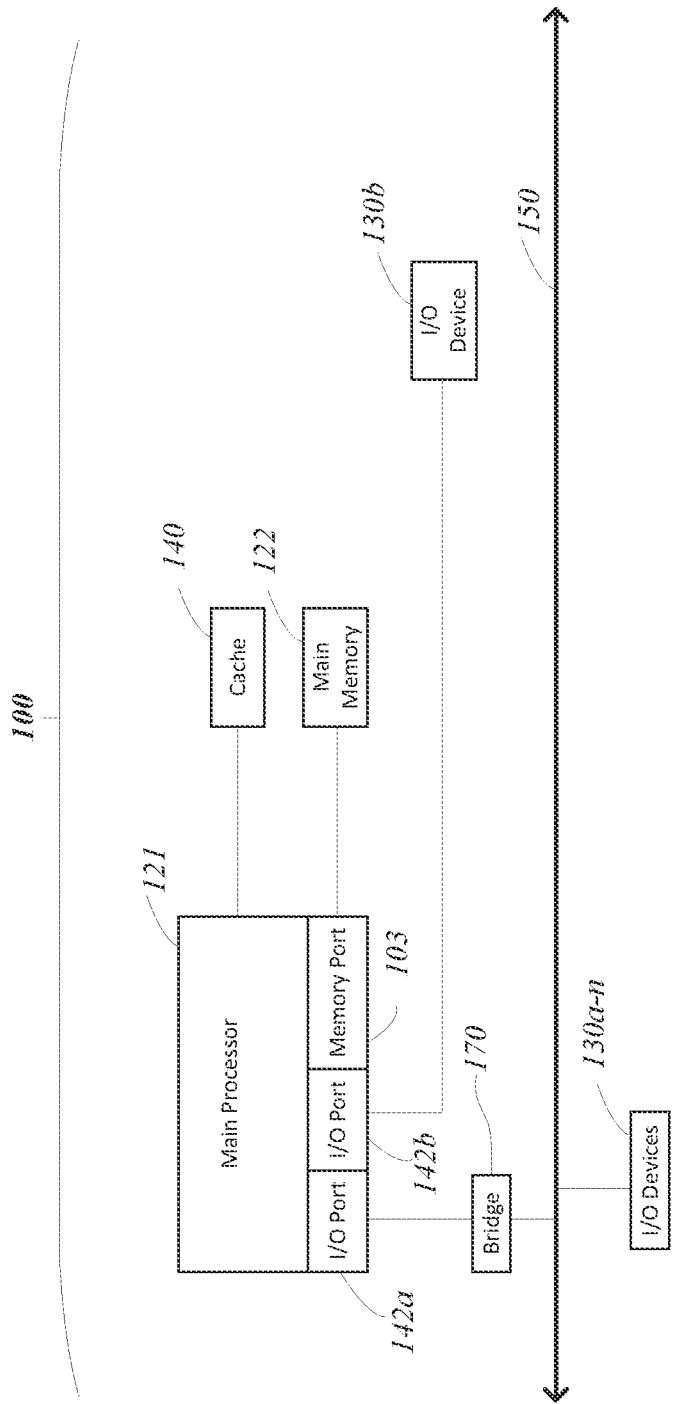

FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an operating system 129, software 131, and a software of a simulated phishing attack system 120. As shown in FIG. 1D, each computing device 100 may also include additional optional elements, e.g., a memory port 103, a bridge 170, one or more input/output devices 130a-130n (generally referred to using reference numeral 130), and a cache memory 140 in communication with the central processing unit 121.

The central processing unit 121 is any logic circuity that responds to and processes instructions fetched from the main memory unit 122. In many embodiments, the central processing unit 121 is provided by a microprocessor unit, e.g. those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include on or more memory chips capable of storing data and allowing any storage location to be directly accessed by the microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphic Port (AGP) to communicate with the display 124 or the I/O controller 123 for the display 124. FIG. 1D depicts and embodiment of a computer 100 in which the main processor 121 communicates directly with I/O device 130b or other processors 121' via HYPER-TRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments, software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102*a*-102*n* may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.1 la/b/g/n/ac CDMA, GSM, WiMAX and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, byAmazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Creating Realistic Simulated Phishing Attacks

The following describes systems and methods for creating simulated phishing attack messages that have characteristics which make them look extremely realistic, while also having characteristics that a user should recognize as being false. There are many techniques already used by malicious actors to make phishing messages seem genuine to the recipient, for example using a company's logo, using a domain that is very similar to a company's domain, using the name of someone important in a company (such as the CEO or head of HR) in the body of a message, or using a message line intended to convey urgency to the recipient, etc. One technique that might be exploited is adding someone that the recipient would recognize as being genuine, for example an individual in the same company, onto the to:, cc:, or bcc: line of the email in an attempt to make the message seem more real to the recipient. However, it would not be ideal to actually send the simulated phishing email to a recipient other than the recipient user—for example to other individuals in the organization—as that would cause confusion.

Figure 2:
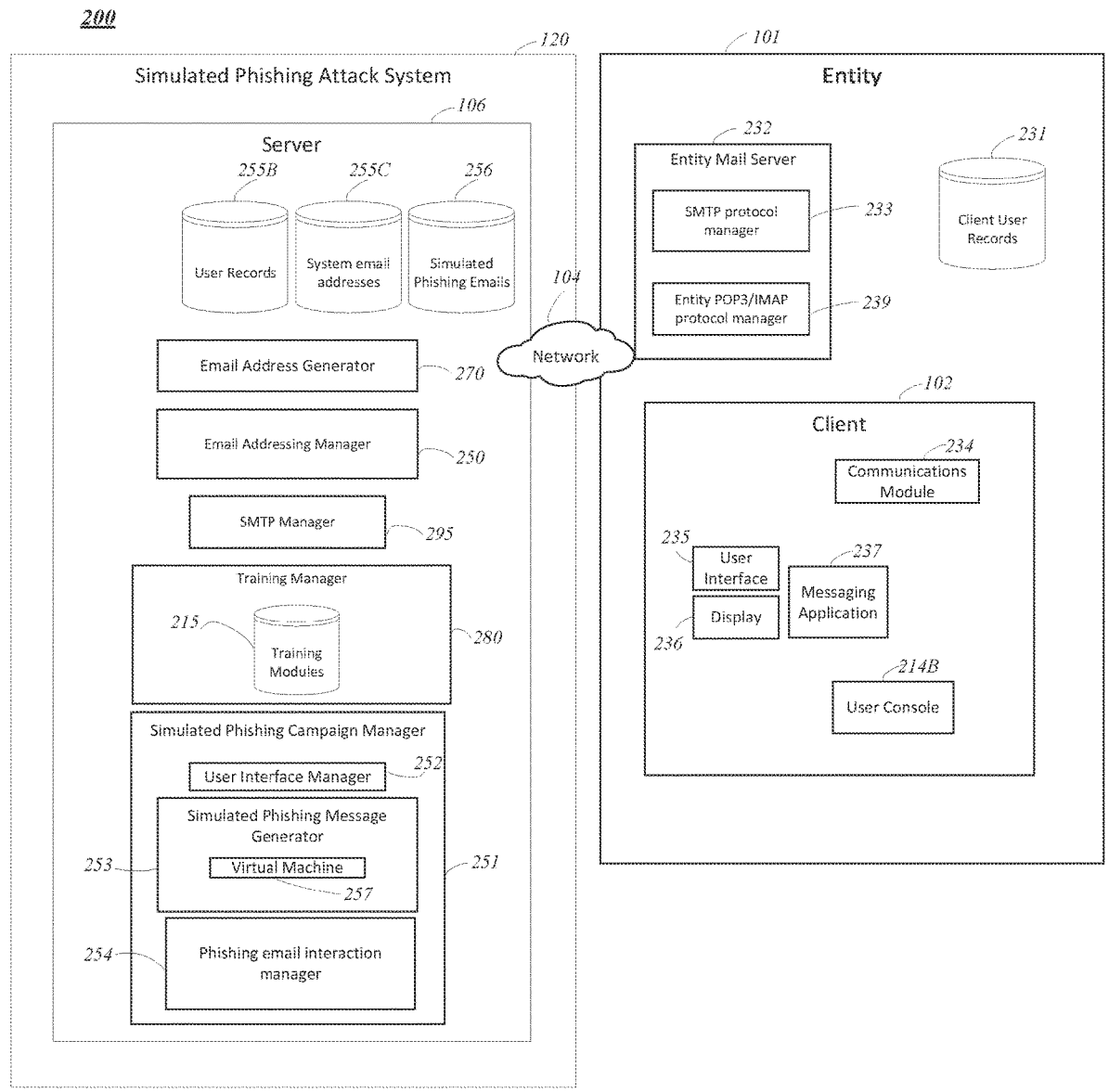
FIG. 2 depicts an implementation of some of the server and client architecture of an implementation of a system capable of creating simulated phishing attack messages that have characteristics which make them look extremely realistic, while also having characteristics that a user should recognize as being false.

Referring to FIG. 2 in a general overview, FIG. 2 depicts some of the architecture of an implementation of a system 200 capable of carrying out a simulated phishing attack campaign, including creating simulated phishing attack messages that have characteristics which make them look extremely realistic, while also having characteristics that a user should recognize as being false. In some implementations, system 200 may include simulated phishing attack system 120 which may include one or more servers represented by server 106, one or more entities represented by entity 101, and one or more networks represented by network 104 allowing communication between these system components. Server 106 may include email address generator 270, which may communicate with user records storage 255B and system email addresses storage 255C and which may, in some examples, contain generated system email addresses and display names for storage in system email addresses storage 255C. In some embodiments, server 106 may include email addressing manager 250 which in some examples interfaces with user records storage 255B and system email addresses storage 255C and may communicate with simulated phishing message generator 253, for example in order to provide email addresses for simulated phishing attack messages. In embodiments, server 106 may include SMTP (Simple Mail Transfer Protocol) manager 295, which may communicate with simulated phishing campaign manager 251 in order to send messages for a simulated phishing campaign. In embodiments, SMTP manager 295 may use other protocols other than SMTP, e.g. X.400 protocol or QMTP (Quick Mail Transfer Protocol), and may be referred to as X.400 manager 295 or QMTP manager 295. In embodiments, as an alternative to SMTP, web-based email may be used, for example Gmail (Google, Mountain View, Calif.), MSN Hotmail (Microsoft, Redmond Wash.), and Yahoo! Mail (Yahoo, Sunnyvale, Calif.). Each of these embodiments use techniques for specifying recipients of email messages that are known in the art, and the current technology described herein may be extended to alternative email protocols. Server 106 may include training manager 280, which may interface in some examples with phishing email interaction manager 254, in order to manage training for users that fail simulated phishing attacks. Training manager 280 may include or interface with training modules storage 215, for example to choose an appropriate training module to be associated with a specific type of simulated phishing attack, for example to train users who fail that type of simulated phishing attack. In some implementations, server 106 may include simulated phishing campaign manager 251, which may be configured to perform simulated phishing campaigns against a user or group of users. Simulated phishing campaign manager 251 may include user interface manager 252 which may enable, for example, a system administrator to configure a simulated phishing campaign, for example a system administrator of server 106 or a system administrator of entity 101 communicating with simulated phishing campaign manager 251 over network 104. Simulated phishing campaign manager 251 may include simulated phishing message generator 253. Simulated phishing message generator 253 may include virtual machine 257. Simulated phishing message generator 253 may interface with simulated phishing emails storage 256, which may contain templates to create simulated phishing messages to be used in a simulated phishing campaign. Simulated phishing campaign manager 251 may include phishing email interaction manager 254, which in some examples records user interactions with simulated phishing messages, for example when a user clicks a link in a simulated phishing message, downloads and/or opens an attachment of a simulated phishing message, forwards a simulated phishing message, or performs any other interaction with a simulated phishing message that is considered by phishing email interaction manager 254 to be a success or a failure. User records storage 255B, system email addresses storage 255C, simulated phishing emails storage 256, and training modules storage 215 may include, be, integrate with or couple to any type or form of storage, such as a database or file system coupled to memory 122.

In some embodiments, system 200 includes one or more entities, represented by entity 101 in FIG. 2. Entity 101 may in some examples represent an organization or a company or any other subscriber to simulated phishing attack system 120. Entity 101 may include entity mail server 232. Entity mail server 232 may be configured to send and receive messages, for example email messages, using standard email protocols. In some examples, entity mail server 232 includes entity SMTP protocol manager 233, which manages the protocols which send outgoing messages, and entity POP3/IMAP protocol manager 239, which manages the protocols which receive incoming messages. Entity 101 may include client user records storage 231, which may contain information about all users or clients 102 that are associated with entity 101.

Entity 101 may include one or more clients represented in FIG. 2 by client 102. In some examples, client 102 may be associated with entity 101. For example, if entity 101 is a company, then client 102 may be an employee of entity 101. Entity 101 may be an organization that has an identity separate from that of its members, users, or clients 101. Entity 101 may comprise one or more networks, computers, servers or software, hosted onsite or offsite e.g., in a cloud, any combination of which may be used by entity 101 in providing capabilities, such as those required by a company or organization. Client 102 may also be referred to as user 102, client device 102, and/or user device 102. Client 102 may include communications module 234, user interface 235 and display 236. In some implementations, client 102 may include messaging application 237. Client 102 may include user console 214B.

Referring to FIG. 2 in more detail, system 200 may include simulated phishing attack system 120 and server 106 which may include email address generator 270. In some embodiments, email address generator 270 may create email addresses that are not associated with a user, i.e., non-recipient email addresses. In examples, the non-recipient email addresses may be valid email addresses which are directed or redirected to server 106. In examples, email address generator 270 may generate and store non-recipient email addresses in system email addresses storage 255C. In embodiments, email address generator 270, through interacting with user records 255B and system email addresses 255C, may create associations between non-recipient email addresses as may be stored in system email addresses 255C and display names, for example display names associated with users as may be stored in user records storage. In examples, names associated with non-recipient email addresses may be used as display names when the non-recipient email addresses are used in an address line of an email message. When an email is generated by simulated phishing message generator 253, it may include one or more non-recipient email addresses for which the display name is that of a user, in any of the to:, cc:, or bcc: address fields of the email. In some embodiments, simulated phishing message generator 253 may select an email address/display name pair such that a user (associated with the display name in the system email address/display name pair) has a relationship with the user who is the intended recipient of the simulated phishing email (the recipient user). In some embodiments, simulated phishing message generator 253 may select a system email address/display name pair such that the person associated with the display name (i.e., the non-recipient user) is not a person with a relationship with the recipient user of the simulated phishing email, but is a person that the recipient user would recognize, which may convince the recipient user that the message is genuine. For example, the person associated with the display name (the non-recipient user) may be a manager of a store known by the recipient user, e.g., "Store Manager<manager@store345.bigretailer.com>". In some examples, the recipient user may have a relationship with the person associated with the display name, and may be convinced by the simulated phishing email to interact with the email. For example, the non-recipient user may be a person in a human resources capacity in the entity of the recipient user, or may be a person in an IT capacity in the entity of the recipient user. In examples, the non-recipient user may be a team member or relative of the recipient user. In these embodiments, the non-recipient user may be any person with which the recipient user has a relationship, such that when the recipient user sees the name of the person (the display name) in the header of an email message, it will lead the recipient user to consider the message as a genuine message. In general, the non-recipient user may be any person such that when the recipient user sees the display name of the non-recipient user in the header of an email message, the recipient user will consider the message as a genuine message.

Simulated phishing message generator 270 may be an application, service, daemon, routine, or other executable logic for generating messages. The messages generated by simulated phishing message generator 270 may be of any appropriate format. For example, they may be email messages, messages used by messaging applications such as, e.g., WhatsApp™ (Facebook, Inc., Menlo Park, Calif.), or any other type of message that may use email addresses. Messages to be used in a simulated phishing attack may be selected by simulated phishing campaign manager 251. The simulated phishing messages may be generated in any appropriate manner, e.g. by running an instance of an application that generates the desired message type, such as running e.g. a Gmail™ application (Google, Inc, Mountain View, Calif.), Microsoft Outlook™ (Microsoft Corp., Redmond, Wash.), WhatsApp™ (Facebook, Inc., Menlo Park, Calif.), a text messaging application, or any other appropriate application. The simulated phishing messages may be generated by running a messaging application on e.g. virtual machine 257 or may simply be run on an operating system of the security awareness system server 106 or may be run in any other appropriate environment.

In some implementations, user records stored in user records storage 255B may comprise data relating to the user's position or role in an organization or entity 101. In embodiments, user records in user records storage 255B may include information about relationships that the user has. For example, user records may include information about teams or business units that the user belongs to and may include information about other users in the team. In an embodiment, user records in user records storage 255B may include information about a geographic location that the user is related to and may include information about other users that are located at the same location.

In some examples, user records 255B may include a user's first name, last name, e-mail address, role or position, title, department, location, time zone, the name of their first line manager, the name of their second line manager, the name of their assistant, the name of their IT professional, or the name of their HR professional. In some examples, the data in user records stored in user records storage 255B may be analogous to user data stored in an active directory of entity 101. In embodiments, client user records 231 may have data input from client 102. Input of data into client user records 231 may be performed via user interface 235 that allows for user input through a non-graphical user interface, such as a user interface that accepts text or vocal input without displaying an interactive image. A graphical user interface may be displayed on a screen of a mobile phone, or a monitor connected to a desktop or laptop computer or may be displayed on any other display 236. A user may interact with e.g. the graphical user interface by typing, clicking a mouse, tapping, speaking, or any other method of interacting with user interface 235. The graphical user interface on the device may be a web-based user interface provided by a web browser (e.g. Google Chrome (Google Inc., Mountain View, Calif.), Microsoft Internet Explorer (Microsoft Corp., Redmond, Wash.), or Mozilla Firefox (Mozilla Foundation, Mountain View, Calif.)), or may be an application installed on a user device capable of opening a network connection to simulated phishing attack system 120, or may be any other type of interface.

In some implementations, simulated phishing emails storage 256 includes templates that include the content of simulated phishing emails. This template may include an attached file of any file format that can be transmitted electronically. The template may enable different formats of communication including text, images, video files, and any kind of attachment or link. In implementations, simulated phishing email templates stored in simulated phishing emails storage 256 may be obtained from simulated phishing message generator 253. In examples, simulated phishing message generator 253 may generate electronic communications templates that can be used as content of simulated phishing emails and which are stored in simulated phishing emails storage 256. Simulated phishing message generator 253 may be integrated with memory 122 so as to provide simulated phishing message generator 253 access to parameters associated with messaging choices made for a particular simulated attack by e.g. simulated phishing campaign manager 251.

User records storage 255B, system email addresses storage 255C, simulated phishing emails storage 256 and client user records 231 may include any type of form of storage, such as a database of file system coupled to memory 122. User records storage 255B, system email addresses storage 255C, simulated phishing emails storage 256 and client user records storage 231 may be integrated with or coupled to memory or a memory store or otherwise a storage, such as a database.

In examples, simulated phishing campaign manager 251 may interact with email addressing manager 250, which may select one or more email address/display name pairs, for example using one or more email addresses from system email addresses storage 255C.

In some embodiments, email addressing manager 250 may interact with user records storage 255B in order to determine what relationships the recipient user of the simulated phishing message has with other users, for example other users of entity 101. Email addressing manager 250 may use this information about relationships to find, for example within system email addresses storage 255C, email address/display name pairs where the display name is the name of one of the users which the recipient user has a relationship with. Email addressing manager 250 may communicate with simulated phishing message generator 253, for example to provide simulated phishing email generator 253 with email addresses to use in the to:, cc:, bcc:, or any other appropriate address field of the simulated phishing message. Simulated phishing message generator 253 may interact with simulated phishing emails storage 256, for example to retrieve a template for a simulated phishing message, into which simulated phishing message generator 253 may insert the email addresses provided by simulated phishing email addressing manager 250.

Simulated phishing message generator 253 may interact with SMTP manager 295, for example to provide SMTP manager 295 with a simulated phishing message to send. In some embodiments, SMTP manager 295 will interact with simulated phishing campaign manager 251, and simulated phishing campaign manager 251 will coordinate and inform SMTP manager 295 as to when to send the simulated phishing message. SMTP manager 295 may communicate with other SMTP servers to deliver the simulated phishing message to client 102. In examples, SMTP manager 295 takes the email address of the recipient user of the simulated phishing message (e.g., "<recipient_user@entity_domain.com>", and divides it into the recipient user name (what is before the @ symbol) and the domain name of entity 101 (what is after the @ symbol). In some examples, SMTP manager 295 communicates with a domain name server (DNS) to determine the IP address for the domain name of entity 101. In embodiments, the SMTP server then delivers the message to the entity's POP3/IMAP protocol manager 239.

In embodiments, client 102 that is the intended recipient of the simulated phishing message is referred to as the recipient user, and clients 102 which are included in one of the address fields of the simulated phishing email message (in order to make the message seem more believable to the recipient user) but to whom the email message should not be delivered, are called non-recipient users. In an embodiment, in addition to populating an address field in a simulated phishing message with the display name and email address of the recipient user, email addressing manager 250 also populates address fields in the simulated phishing message with display name/email address pairs of one or more non-recipient users.

In some embodiments, simulated phishing campaign manager 251 interacts with simulated phishing message generator 253 in order to send simulated phishing messages. In examples, simulated phishing message generator 253 uses simple text commands to communicate to SMTP manager 295.

In examples, a display name may be shown on the header of the email, and the email address associated with the display name is the email address for the non-recipient user. If the recipient user of the simulated phishing message hovers over, clicks on, or otherwise interacts with the display name of a non-recipient user that is shown on the email, the recipient user will see the email addresses for the non-recipient user, which will reinforce the belief that the message is genuine, in some cases causing the recipient user to overlook other parts of the email which indicate that the email is not genuine. In embodiments where email addressing manager 250 populates address fields in the simulated phishing message with real address/display name pairs where the email addresses are the real email addresses of the non-recipient users associated with the respective display names), simulated phishing message generator 253 uses the RCPT TO: command to specify to SMTP manager 295 which of the email address/display name pairs is that of the recipient user. In this example, the simulated phishing message generator 253 does not specify non-recipient users in the address header of the simulate phishing message to SMTP manager 295 using the RCPT TO: command, and so SMTP manager 295 does not send the email to the email addresses associated with the non-recipient users. In this way, the simulated phishing message that is received by the recipient user appears to the recipient user to have been sent to the non-recipient users that are shown in the header of the simulated phishing communication, however the simulated phishing communication was not in fact sent to the non-recipient users. Rather the simulated phishing communication was only sent to the recipient user, which was specified to SMTP manager 295 from simulated phishing message generator 253 using the RCPT TO: command. In embodiments, a display name may be shown on the header of the email, and the email address associated with the display name is not a real email address for the person represented by or associated with the display name, and in some examples is an email address generated by email address generator 270 and designed to be associated with an email domain of, for example, server 106 or IT administrator of entity 101. In some examples, simulated phishing message generator 253 may specify the non-recipient users in the address header of the simulated phishing message to SMTP manager 295 using the RCPT TO: command, and so the SMTP manager 295 does send the email to the email addresses associated with the display names of the non-recipient users, however the email is not sent to the non-recipient user, and instead is sent to server 106, or to an IT administrator of entity 101. In embodiments, the display name associated with a system email address in the email address/display name pair may be the name of someone in a community leadership position, such as a principal of a school, or a mayor of a city. In examples, the display name associated with a system email address in the email address/display name pair may be the name of a person that may or may not have a direct relationship with the user but nonetheless is someone that the user would recognize or know of.

In embodiments, email addressing manager 250 populates address fields in the simulated phishing message with email address/display name pairs of one or more non-recipient users (i.e. the display name is that of the non-recipient user, and the email address is also that of the non-recipient user), and simulated phishing message generator 253 uses the RCPT TO: command to specify only the recipient user to SMTP manager 295. In embodiments, the recipient user's email address may be included in one or more of the to:, cc:, or bcc: fields along with one or more email address/display name pairs, where the display name is displayed in the email header.

In some examples, simulated phishing message generator 253 may interact with SMTP manager 295, for example to provide SMTP manager 295 with a simulated phishing message to be sent to a recipient user.

In some implementations, simulated phishing message generator 253 may include virtual machine 257, which may be an application, service, daemon, routine, or other executable logic that assists the simulated phishing message generator 253 in producing simulated phishing messages.

In some examples, simulated phishing campaign manager 251 may provide access as needed to various applications, modules, and other software components of the security awareness server 106 to other various applications, modules, and other software components of the simulated phishing campaign manager 251, and may monitor and control timing of various aspects of a simulated attack, may process requests for access to attack results, or may perform other tasks related to the management and configuration of a simulated attack.

In some embodiments, phishing email interaction manager 254 is configured to interpret that the recipient user has been tricked by the simulated phishing message. Phishing email interaction manager 264 may interact with training manager 280, for example in response to recipient user interaction with the simulated phishing message. In examples, training manager 280 may deliver a training module to recipient user via network 104 in response to user interaction with a simulated phishing message, for example using information from training models storage 215. In examples, training modules storage 215 may comprise links, videos, electronic documents, slideshows, or any type, or means, of relaying training content to recipient user (for example client 102). In an example, the simulated phishing message may include a link that is clicked by the recipient user. The link may lead the recipient user to a webpage that contains training materials from training modules storage 215.

In some implementations, entity 101 comprises the entity mail server 232. Entity email server 232 may contain entity SMTP protocol manager 233 and entity POP3/IMAP protocol manager 239. User interface 235 may be, e.g., an application on a device that allows a user of the device to interact with server 106 for the purposes of viewing and interacting with simulated phishing messages. In implementations, user interface 235 is shown on display 236. Display 236 may be a screen of a mobile phone, or a monitor connected to a desktop or laptop computer or may be any other display. A user may interact with e.g. user interface 235 by typing, clicking a mouse, tapping, speaking, or any other method of interacting with a user interface. User interface 235 on user device 102 may be a web-based user interface provided by a web browser (e.g. Google Chrome (Google, Mountain View, Calif.), Microsoft Internet Explorer (Microsoft, Redmond, Wash.), or Mozilla Firefox (Mozilla Foundation, Mountain View, Calif.), or may be an application installed on user device 102 capable of opening a network connection to server 106, or may be any other type of interface.

In some embodiments, client 102 may have entity mail server 232, that may interact with SMTP manager 295 to receive simulated phishing communications. SMTP manager 295 may interact with SMTP protocol manager 233 and entity POP3/IMAP protocol manager 239 to enable the client to send and receive email communications from server 106.

Each of user records 255B, system email addresses 255C, simulated phishing emails 256, email address generator 270, email addressing manager 250, SMTP manager 295, training manager 280, training modules 215, simulated phishing campaign manager 251, user interface manager 252, simulated phishing message generator 253, virtual machine 257, phishing email interaction manager 254, network 104, entity 101, entity mail server 232, entity SMTP protocol manager 233, entity POP3/IMAP protocol manager 239, client 102, communications module 234, user interface 235, display 236, messaging application 237, and user console 214B may comprise a program, service, task, script, library, application or any type and form of executable instructions or code executable on one or more processors. Each of user records 255B, system email addresses 255C, simulated phishing emails 256, email address generator 270, email addressing manager 250, SMTP manager 295, training manager 280, training modules 215, simulated phishing campaign manager 251, user interface manager 252, simulated phishing message generator 253, virtual machine 257, phishing email interaction manager 254, network 104, entity 101, entity mail server 232, entity SMTP protocol manager 233, entity POP3/IMAP protocol manager 239, client 102, communications module 234, user interface 235, display 236, messaging application 247, and user console 214B may be combined into one or more modules, applications, programs, services, tasks, scripts, libraries, applications, or executable code.

Server 106 may be a part of a cluster of servers 106. In some embodiments, tasks performed by server 106 may be performed by a plurality of servers. These tasks may be allocated among the plurality of servers by an application, service, daemon, routine, or other executable logic for task allocation. The server 106 may include a processor and memory. Some or all of server 106 may be hosted on cloud 108, for example by Amazon Web Services (AWS, Amazon, Seattle, Wash.).

In some implementations, client 102 may include communications module 234. This may be a library, application programming interface (API), a set of scripts, or any other code that may facilitate communications between client 102 and any of server 106, a third-party server, or any other server. In some embodiments, communications module 234 determines when to transmit information from client 102 to external servers via network 104. In some embodiments, communications module 234 receives information from server 106 via network 104. In some embodiments, the information transmitted or received by communications module 234 may correspond to a message, such as an email, generated or received by messaging application 237.

In some examples, client 102 may receive simulated phishing messages via messaging application 237, display received messages for the user using display 236, and accept user interaction via user interface 235 responsive to displayed messages. In some embodiments, if the user interacts with a simulated cybersecurity attack, server 106 may encrypt files on the client device.

Figure 3:
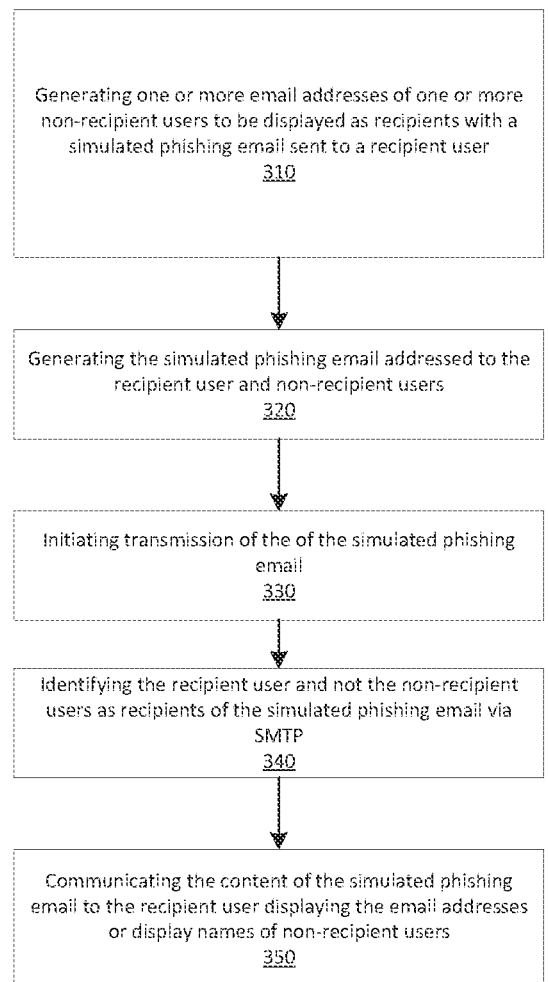
FIG. 3 depicts an implementation of a method for creating simulated phishing attack messages that have characteristics which make them look extremely realistic, while also having characteristics that a user should recognize as being false.

Referring to FIG. 3 in a general overview, FIG. 3 depicts an implementation of a method 300 for creating simulated phishing attack messages that have characteristics which make them look extremely realistic, while also having characteristics that a user should recognize as being false. In step 310, method 300 may include generating one or more email addresses of one or more non-recipient users to be displayed as recipients of a simulated phishing email sent to a recipient user. Step 320 may include generating the simulated phishing email addressed to the recipient user and non-recipient users. Step 330 may include initiating transmission of the simulated phishing email. Step 340 may include identifying the recipient user as recipient of the simulated phishing email via one or more SMTP commands or other web-based client email commands. Step 350 may include communicating the content of the simulated phishing email to the recipient user and displaying the email addresses or display names of non-recipient users on the received email.

Referring to FIG. 3 in more detail, in step 310, method 300 may include generating email addresses that are real email addresses of the one or more non-recipient users. The one or more non-recipient users may be users of an entity such as entity 101. In some examples, these may be email addresses that are stored within client user records 231 and added to server user records 255B via network 104. In embodiments, email addresses stored within client user records 231 may be input by a user such as a system administrator of entity 101, via user interface 235 of client 102. Email addresses of non-recipient users may be associated by server 106, inside to:, cc:, bcc: or any other appropriate address field of the simulated phishing email. Step 310 may also include generating display names from information from user records 255B and combining them to be displayed with the recipient user's email in various address fields of the email header, e.g., the to:, cc:, and/or bcc: fields.

Step 310 may also include generating email addresses that will return to server 106 or to a mailbox associated with server 106 instead of them being associated with email addresses that are associated with the entity. In some examples, email addresses may be generated by system 200 using email address generator 270 or using information from user records, e.g. client user records 231. In some examples, system 200 may find information in user records indicative of a user that is an IT administrator (for example, IT@entitydomain.com. In this embodiment, step 310 may include generating display names to be combined with the generated email addresses, e.g., creating email address/display name pairs. In some embodiments, display names are associated with user records from user records storage 255B.

In some embodiments, in step 310 server 106 populates one or more address fields in the simulated phishing email with email address/display name pairs, such that the display names that will be shown in the simulated phishing email correspond to users of entity 101 or to people that the recipient user would know or be familiar with, however email addresses associated with the display names correspond to system email addresses that will deliver an email sent to those address to server 106 or to a mailbox associated with server 106. In some examples, emails sent to system email addresses 255C may deliver to an IT administrator mailbox associated with entity 101.

Step 320 may include generating one or more simulated phishing emails, for example using input from a system administrator of server 106 to configure one or more simulated phishing campaigns using user interface manager 252 to communicate via network 104 with simulated phishing campaign manager 251. Virtual machine 257 may generate simulated phishing messages according to the configuration by simulated phishing campaign manager 251. Step 320 may include populating one or more address header fields of the simulated phishing email with the email address of the recipient user. Step 320 may further include populating one or more address header fields of the simulated phishing email with one or more email addresses of the non-recipient users. In some embodiments, in step 320 server 106 populates one or more address fields in the simulated phishing email with email address/display name pairs, for example with information from user records storage 255B.

In step 330, server 106 may initiate transmission of the simulated phishing email, for example to a mail server of entity 101. This may include establishing, for example by an SMTP manager 295 of server 106, an SMTP session with an SMTP protocol manager 233 of entity mail server 232 of entity 101. The session may begin with the SMTP manager 295 sending an HELO message to entity mail server 232. After SMTP protocol manager 233 responds appropriately, SMTP manager 295 may identify the sender of the simulated phishing email with a MAIL FROM: command to SMTP protocol manager 233.

In step 340, method 300 may further include identifying via SMTP or another protocol, only the recipient user and not the non-recipient users as recipients of the simulated phishing email. In some embodiments, step 340 may comprise communicating via SMTP and by SMTP manager 295 of server 106, a RCPT TO: command to entity mail server 232 of entity 101 to identify to entity mail server 232 the recipient user as the recipient of the simulated phishing email. An RCPT TO: command tells a server that is receiving an email who the recipient of the email is, so that the server can agree to receive email for said email address. In examples, the RCPT TO: command excludes email addresses of non-recipient users such that non-recipient users are not identified as recipients of the simulated phishing email to entity mail server 232. Thus, in examples, recipient users are included in the RCPT TO: command as recipients of the simulated phishing email while non-recipient users are not.

In step 350, method 300 may include communicating the content of the simulated phishing email to the recipient user such that email addresses and/or display names of non-recipient users are displayed to the recipient user as additional recipients of the email, even though the non-recipient users may not receive the mail. In implementations, step 350 may include communicating, via SMTP and by SMTP manager 295 of server 106, a DATA command to entity mail server 232 of entity 101 to communicate content of the simulated phishing email 256. Content of simulated phishing email 256 may include one or more email addresses of one or more non-recipient users. In some embodiments, the simulated phishing email received by the recipient user displays the names and/or the email addresses of the non-recipient users in the displayed email, and the recipient user may believe that the email has been sent to the non-recipient users based on the presence of their names and/or email addresses in the header of the received email message. In some embodiments, the recipient user may click on the name of the non-recipient user and the detailed information about the non-recipient user may display the non-recipient user's email address. In some examples, the display name of the non-recipient user is displayed, however the email address associated with the non-recipient user is a system email address associated with a server email inbox or an entity IT administrator email inbox. In some embodiments, only the display name of the email address/display name pair is visible to the recipient user, and the system email address associated with the display name is not displayed to the recipient user.

While not explicitly shown in FIG. 3, some embodiments of method 300 may subsequently include identifying, by phishing email interaction manager 254 of server 106, whether the recipient user interacted with the simulated phishing email and responsive to identifying that the recipient user interacted with the simulated phishing email, determining by training manager 280 a training module for the user selected from training modules 215.

FIG. 4 depicts an example SMTP session according to some embodiments, in which a simulated phishing email is sent from server 106 of simulated phishing attack system 120, to entity mail server 232 of entity 101. Lines prefixed with "←" are received from entity mail server 232. Lines prefixed with "→" are sent to entity mail server 232. The simulated phishing email is to be sent to a recipient user with address <user@customer.com>. Following connection establishment, the sequence shows an RCPT TO: command in which the recipient user's email address is included. A 250 response is received from entity mail server 232 to indicate "requested mail action okay, completed", i.e. there is no error. The sequence then shows the initiation of a DATA command to entity mail server 232. Entity mail server 232 returns a 354 response "Go ahead" subsequent to which server 106 communicates the content of the mail to entity mail server 232. In some embodiments, in the email content, the recipient user's email address is included in the "To:" line field. In examples, the recipient user's email address is included in the cc: line field or in the bcc: line field, or in more than one of the to:, cc:, and bcc: fields. However, a non-recipient user's email address<user's-boss@customer.com> is also included in the "To:" line field of the DATA command despite this address not being included in the RCPT TO: command. This causes the non-recipient user's email address to be displayed as a recipient of the simulated phishing email, even though the non-recipient user does not receive the email. Content in the body of the phishing email concerns a bank wire transfer and includes a link for the recipient user to interact with. If the recipient user interacts with the link, this may be recorded by simulated phishing attack system 120 and may further be used to select one or more training modules 215 for the recipient user to undertake.

The systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method comprising:
creating, by one or more processors, a simulated phishing email addressed via one or more address fields to a recipient user and one or more non-recipient users, the one or more non-recipient users addressed using one or more valid email addresses of the one or more non-recipient users, wherein the one or more valid email addresses comprises an email address of an individual in a same organization as the recipient user;
initiating, by the one or more processors, transmission of the simulated phishing email to a mail system;
communicating, by the one or more processors, to the mail system a first command of a RCPT TO command to a mail transfer protocol to include the recipient user as a recipient of the simulated phishing email and to exclude the one or more valid email addresses of the one or more non-recipient users addressed in the one or more address fields from receiving the simulated phishing email; and
communicating, by the one or more processors to the mail system, a second command of a DATA command to the mail transfer protocol that identifies one or more email addresses of the one or more non-recipient users with content of the simulated phishing email to the recipient user to cause displaying the one or more valid email addresses of the one or more non-recipient users in one or more address fields of the simulated phishing email to the recipient user to appear that the simulated phishing email was communicated to the one or more non-recipient users that were excluded from receiving the simulated phishing email by the first command.

2. The method of claim 1, wherein the first command is the RCPT TO command of the mail transfer protocol comprising a simple mail transfer protocol (SMTP).

3. The method of claim 1, wherein the second command is the DATA command of the mail transfer protocol comprising a simple mail transfer protocol (SMTP).

4. The method of claim 1, further comprising identifying, by the one or more processors, for the recipient user the one or more valid email addresses of the one or more non-recipient users to be displayed as a recipient of the simulated phishing email when received by the recipient user.

5. The method of claim 1, wherein the one or more valid email addresses comprises an email address of an individual with a relationship to the recipient user.

6. The method of claim 1, further comprising initiating, by the one or more processors, transmission of the simulated phishing email to the mail system.

7. The method of claim 1, wherein the simulated phishing email is displayed to the recipient user with the one or more valid email addresses of the one or more non-recipient users as recipients of the simulated phishing email.

8. The method of claim 1, further comprising receiving, by the one or more processors, an indication that the recipient user interacted with the simulated phishing email.

9. The method of claim 8, further comprising identifying, by the one or more processors based at least on the indication, training for the recipient user.

10. A system comprising:
one or more processors, coupled to memory and configured to:
create a simulated phishing email addressed via one or more address fields to a recipient user and one or more non-recipient users, wherein the one or more non-recipient users are addressed using one or more valid email addresses of the one or more non-recipient users, wherein the one or more valid email addresses comprises an email address of an individual in a same organization as the recipient user;
initiate transmission of the simulated phishing email to a mail system;
communicate to the mail system a first command of a RCPT TO command to a mail transfer protocol to include the recipient user as a recipient of the simulated phishing email and to exclude the one or more valid email addresses of the one or more non-recipient users addressed in the one or more address fields from receiving the simulated phishing email; and
communicate to the mail system a second command of a DATA command to the mail transfer protocol that identifies one or more email addresses of the one or more non-recipient users with content of the simulated phishing email to the recipient user to cause displaying the one or more valid email addresses of the one or more non-recipient users in one or more address fields of the simulated phishing email to the recipient user to appear that the simulated phishing email was communicated to the one or more non-recipient users that were excluded from receiving the simulated phishing email by the first command.

11. The system of claim 10, wherein the first command is the RCPT TO command of the mail transfer protocol comprising a simple mail transfer protocol (SMTP).

12. The system of claim 10, wherein the second command is the DATA command of the mail transfer protocol comprising a simple mail transfer protocol (SMTP).

13. The system of claim 10, wherein the one or more processors are further configured to identify for the recipient user the one or more valid email addresses of the one or more non-recipient users to be displayed as a recipient of the simulated phishing email when received by the recipient user.

14. The system of claim 10, wherein the one or more valid email addresses comprises an email address of an individual with a relationship to the recipient user.

15. The system of claim 10, wherein the one or more processors are further configured to initiate transmission of the simulated phishing email to the mail system.

16. The system of claim 10, wherein the simulated phishing email is displayed to the recipient user with the one or more valid email addresses of the one or more non-recipient users as recipients of the simulated phishing email.

17. The system of claim 10, wherein the one or more processors are further configured to receive an indication that the recipient user interacted with the simulated phishing email.

18. The system of claim 17, wherein the one or more processors are further configured to determine, based at least on the indication, training for the recipient user.

\* \* \* \* \*